US008611724B2

(12) United States Patent
Masutani

(10) Patent No.: US 8,611,724 B2
(45) Date of Patent: Dec. 17, 2013

(54) COMPUTER READABLE MEDIUM, INFORMATION PROCESSING APPARATUS AND METHOD FOR PROCESSING MOVING IMAGE AND SOUND

(75) Inventor: Eriko Masutani, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 122 days.

(21) Appl. No.: 13/044,020

(22) Filed: Mar. 9, 2011

(65) Prior Publication Data

US 2011/0317984 A1   Dec. 29, 2011

(30) Foreign Application Priority Data

Jun. 28, 2010 (JP) ................. 2010-146870

(51) Int. Cl.
*H04N 5/94* (2006.01)

(52) U.S. Cl.
USPC ............. 386/248; 386/239; 386/241

(58) Field of Classification Search
None
See application file for complete search history.

(56) References Cited

U.S. PATENT DOCUMENTS

| | | | |
|---|---|---|---|
| 6,349,303 B1 | 2/2002 | Saito | |
| 2007/0286567 A1* | 12/2007 | Yanagita | 386/52 |
| 2008/0002890 A1 | 1/2008 | Hu | |
| 2010/0008641 A1* | 1/2010 | Murabayashi | 386/54 |
| 2010/0080536 A1* | 4/2010 | Marumori | 386/102 |
| 2010/0153977 A1* | 6/2010 | Valentin | 719/328 |
| 2010/0198599 A1* | 8/2010 | Miyata | 704/260 |
| 2010/0280638 A1* | 11/2010 | Matsuda et al. | 700/94 |

FOREIGN PATENT DOCUMENTS

| | | |
|---|---|---|
| JP | 11-175517 | 7/1999 |
| JP | 2001-265378 | 9/2001 |
| JP | 2003-5790 | 1/2003 |
| JP | 2003085572 A | 3/2003 |
| JP | 2004056286 A | 2/2004 |
| JP | 2006-60648 | 3/2006 |
| JP | 2007027990 A | 2/2007 |
| JP | 2007266793 A | 10/2007 |
| JP | 2008-9576 | 1/2008 |

OTHER PUBLICATIONS

Japanese Official Action dated May 14, 2013 received in related application JP 2009-03109, together with an English-language translation.
Japanese Official Action dated May 14, 2013 received in related application JP 2010-146870, together with an English-language translation.

* cited by examiner

Primary Examiner — Huy T Nguyen
Assistant Examiner — Eileen Adams
(74) Attorney, Agent, or Firm — Scully, Scott, Murphy & Presser, P.C.

(57) ABSTRACT

A computer readable medium is provided. The computer readable medium has recorded an information processing program for causing a computer to execute a function including: a still image extraction mechanism; a sound detection mechanism; a moving image editing point setting mechanism; a moving image editing point determination mechanism; a sound editing point setting mechanism; a text extraction mechanism for converting a voice sound into a text and extracting the text; a still image selection mechanism for selecting a still image outputted at a moving image editing point; and a combination mechanism for combining the text extracted by the text extraction mechanism into the still image.

14 Claims, 10 Drawing Sheets

SPEECH LIST

| 40 | Time (s:ss) - 42 | TEXT - 44 | SPEAKER - 46 | AREA (pixel) - 48 |
|---|---|---|---|---|
| 1 | −01:48 | □□□□□□□□□□□□ | A | xxx |
| 2 | 01:38 | □□□□□□□□□ | B | xxx |
| 3 | 03:58 | □□□□□ | C | xx |
| 4 | 06:38 | □□□□□□□□□□□ | D | xxx |
| 5 | 08:01 | □□ | E | xx |

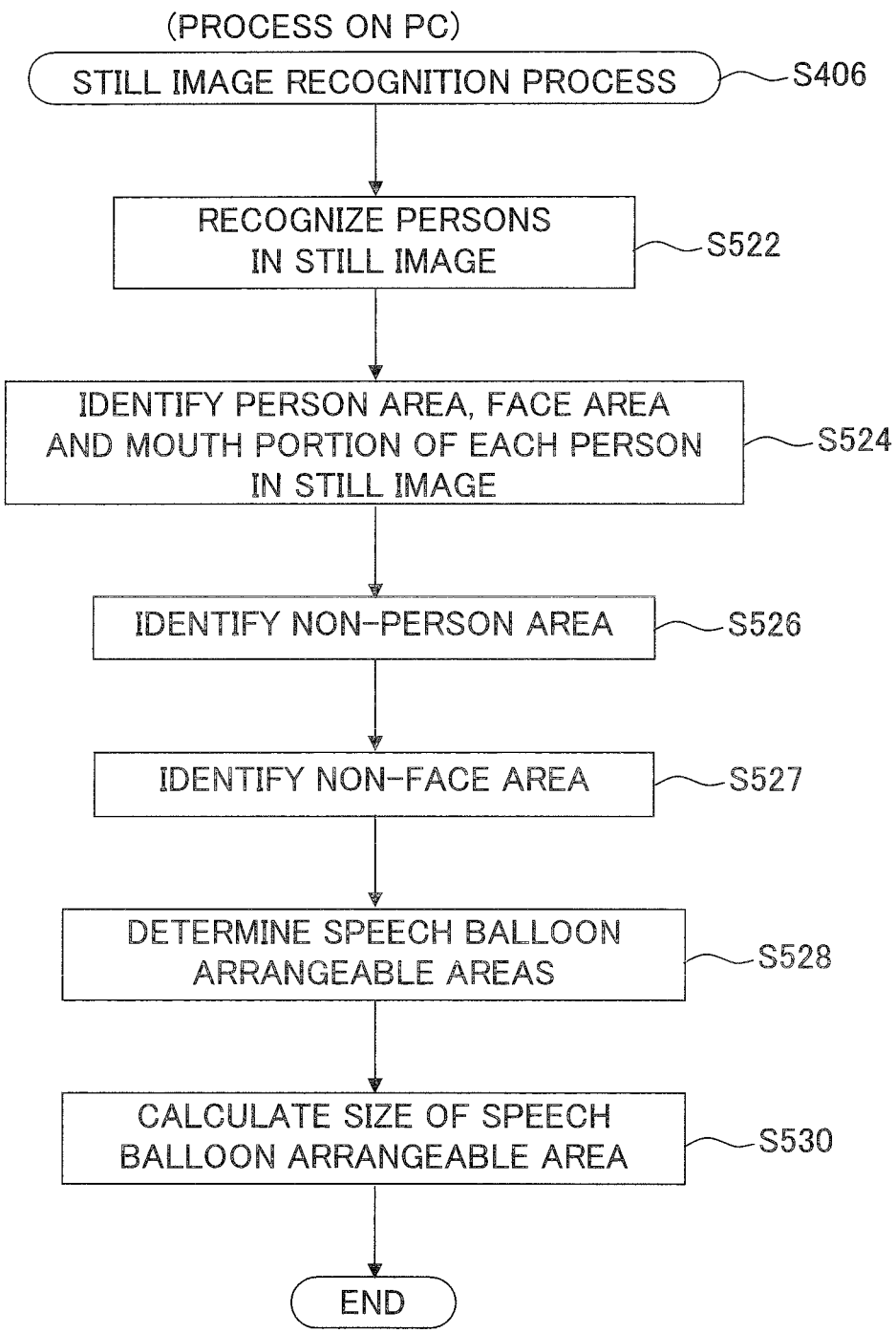

COMPUTER READABLE MEDIUM, INFORMATION PROCESSING APPARATUS AND METHOD FOR PROCESSING MOVING IMAGE AND SOUND

CROSS REFERENCE TO RELATED APPLICATION

The present application claims priority from Japanese Patent Application No. 2010-146870, filed on Jun. 28, 2010, the disclosure of which is incorporated herein by reference in its entirety.

BACKGROUND OF THE INVENTION

1. Field of the Invention

The present invention relates to non-transitory computer readable media having recorded information processing programs, information processing apparatuses, and a method for processing a moving image and a sound to be synchronously played with the moving image.

2. Description of the Related Art

Conventionally, there have been known technologies for printing a scene of a moving image as a still image. For example, Japanese Patent Application Laid-Open No. 2006-060648 discloses a printer which divides a moving image data into a predetermined number of sections, displays a plurality of still image data acquired based on predetermined frame images belonging to the sections, and carries out printing of the still image data selected by a user from the displayed still image data.

However, with respect to the above conventional technologies, even though a moving image carrying sounds such as moving images and the like taken by a video camera, for example, the sounds included in the moving image were not reflected in the still images. Therefore, it was difficult to clearly express the situation on the moving image according to a predetermined timing with the still image acquired from the moving image.

SUMMARY OF THE INVENTION

The present invention is configured to solve the above problem, and has an object to provide a non-transitory computer readable medium having recorded an information processing program, an information processing apparatus which are capable of generating an image which more clearly expresses the situation on the moving image according to a predetermined timing, and a method for processing a moving image and a sound to be synchronously played with the moving image.

According to a first aspect of the present invention there is provided a non-transitory computer readable medium, storing an information processing program therein which is to be executed on a computer in which a processing for a moving image and a sound to be synchronously played with the moving image are executed, wherein the information processing program causes the computer to execute as a plurality of units including:

a moving image editing point setting unit which is configured to set, as a moving image editing point for a moving image, a point of time included in a play-section of the moving image, wherein the point of time set as the moving image editing point by the moving image editing point setting unit is at a time subsequent to storage of the moving image;

a still image data extraction unit which is configured to extract a still image data corresponding to an image outputted at the moving image editing point set by the moving image editing point setting unit;

a moving image editing point determination unit which is configured to determine whether or not the moving image editing point set by the moving image editing point setting unit is within a voiced sound section, wherein the voiced sound section is a section in which a voice sound is within the sound to be synchronously played with the moving image and which includes a voiced sound start point as a start point of the voiced sound section and a voiced sound end point as an end point of the voiced sound section;

a sound acquire unit which is configured to acquire a plurality of sound data, each corresponding to the voiced sound start point and the voiced sound end point, regarding a plurality of pieces of the voiced sound section, respectively, in the play-section of the moving image, wherein the plurality of voiced sound sections include the voiced sound start point determined by the moving image editing point determination unit as including the moving image editing point therein, and also include another voiced sound start point until a predetermined elapsed period of time is elapsed after the voiced sound start point; and the sound acquire unit is configured to acquire the plurality of sound data regarding the voiced sound sections, respectively, in which the voiced sound start point is included from the moving image editing point until the predetermined elapsed period of time is elapsed after the moving image editing point even when the voiced sound end point is not included, in each of the voiced sound sections, from the moving image editing point until the predetermined elapsed period of time is elapsed after the moving image editing point;

a text extraction unit which is configured to extract a plurality of texts converted from the plurality of sound data, respectively, acquired by the sound acquire unit; and a combined data preparation unit which is configured to prepare a data for generating a text-combined still image in which the plurality of texts extracted by the text extraction unit are combined into a still image based on the still image data extracted by the still image data extraction unit.

Further, it is possible to configure the present invention in various forms such as an information processing apparatus, an information processing method, a recording medium recording an information processing program, an information processing system including an information processing apparatus and an output device, etc. Further, the computer readable medium is not limited to portable recording media such as CD-ROM, DVD-ROM and the like, but also includes internal and external memory devices such as ROM, HDD and the like.

According to the first aspect of the present invention, when the moving image editing point is determined as included in a voiced sound section, the sound editing point is set based on the start point of time of the voiced sound section including the moving image editing point. Then, the text extraction mechanism converts the voice sound to be played after the sound editing point into a text and extracts the text. Further, the still image selection mechanism selects the still image outputted at the moving image editing point among a plurality of still images composing the moving image. Then, the composition mechanism combines the text extracted by the text extraction mechanism into the still image selected by the still image selection mechanism. Therefore, there is an effect of being able to generate an image which more clearly expresses the situation on the moving image according to a predetermined timing.

Here, the "text based on the person in the still image" means the "text acquired by converting the voice sound produced by the person in the still image".

According to a second aspect of the present invention, there is provided an information processing apparatus which is configured to processes a moving image and a sound to be synchronously played with the moving image, the information processing apparatus including:

a moving image editing point setting unit which is configured to set, as a moving image editing point for a moving image, a point of time included in a play-section of the moving image,
  wherein the point of time set as the moving image editing point by the moving image editing point setting unit is at a time subsequent to storage of the moving image;
a still image data extraction unit which is configured to extract a still image data corresponding to an image outputted at the moving image editing point set by the moving image editing point setting unit;
a moving image editing point determination unit which is configured to determine whether or not the moving image editing point set by the moving image editing point setting unit is within a voiced sound section,
  wherein the voiced sound section is a section in which a voice sound is within the sound to be synchronously played with the moving image and which includes a voiced sound start point as a start point of the voiced sound section and a voiced sound end point as an end point of the voiced sound section;
a sound acquire unit which is configured to acquire a plurality of sound data, each corresponding to the voiced sound start point and the voiced sound end point, regarding a plurality of pieces of the voiced sound section, respectively, in the play-section of the moving image,
  wherein the plurality of voiced sound sections include the voiced sound start point determined by the moving image editing point determination unit as including the moving image editing point therein, and also include another voiced sound start point until a predetermined elapsed period of time is elapsed after the voiced sound start point; and
  the sound acquire unit is configured to acquire the plurality of sound data regarding the voiced sound sections respectively, in which the voiced sound start point is included from the moving image editing point until the predetermined elapsed period of time is elapsed after the moving image editing point, even when the voiced sound end point is not included, in each of the voiced sound sections, from the moving image editing point until the predetermined elapsed period of time is elapsed after the moving image editing point;
a text extraction unit which is configured to extract a plurality of texts converted from the plurality of sound data, respectively, acquired by the sound acquire unit; and
a combined data preparation unit which is configured to prepare a data for generating a text-combined still image in which the plurality of texts extracted by the text extraction unit are combined into a still image based on the still image data extracted by the still image data extraction unit.

According to a third aspect of the present invention, there is provided a method for processing a moving image and a sound to be synchronously played with the moving image, the method including:

a step of setting a moving image editing point in which, as a moving image editing point for a moving image, a point of time within a play-section of the moving image is set,
  wherein the point of time set as the moving image editing point is at a time subsequent to storage of the moving image;
a step of extracting a still image data, in which a still image data corresponding to an image outputted at the moving image editing point set by the step of setting the moving image editing point is extracted;
a step of determining a moving image editing point in which whether or not the moving image editing point set by the step of setting the moving image editing point is within a voiced sound section is determined,
  wherein the voiced sound section is a section in which a voice sound is included in the sound to be synchronously played with the moving image and which includes a voiced sound start point as a start point of the voiced sound section and a voiced sound end point as an end point of the voiced sound section;
a step of acquiring a plurality of sound data, each corresponding to the voiced sound start point and the voiced sound end point regarding a plurality of pieces of the voiced sound section, respectively, in the play-section of the moving image,
  wherein the plurality of voiced sound sections include the voiced sound start point determined by the step of the moving image editing point as including the moving image editing point therein, and also include another voiced sound start point until a predetermined elapsed period of time is elapsed after the voiced sound start point; and
  at the step of acquiring the plurality of sound data, the plurality of sound data regarding the voiced sound sections, respectively is acquired, in which the voiced sound start point is included from the moving image editing point until the predetermined elapsed period of time is elapsed after the moving image editing point, even when the voiced sound end point is not included, in each of the voiced sound sections, from the moving image editing point until the predetermined elapsed period of time is elapsed after the moving image editing point;
a step of extracting a plurality of texts converted from the plurality of sound data, respectively, acquired by the step of acquiring the plurality of sound data; and
a step of preparing a data for generating a text-combined still image is prepared in which the plurality of texts extracted by the step of extracting the plurality of texts are combined into a still image based on the still image data extracted by the step of extracting the still image data.

BRIEF DESCRIPTION OF THE DRAWINGS

FIG. 5B is a flowchart showing a still image recognition process carried out by the CPU of the PC;

DESCRIPTION OF THE PREFERRED EMBODIMENT

Figure 1:
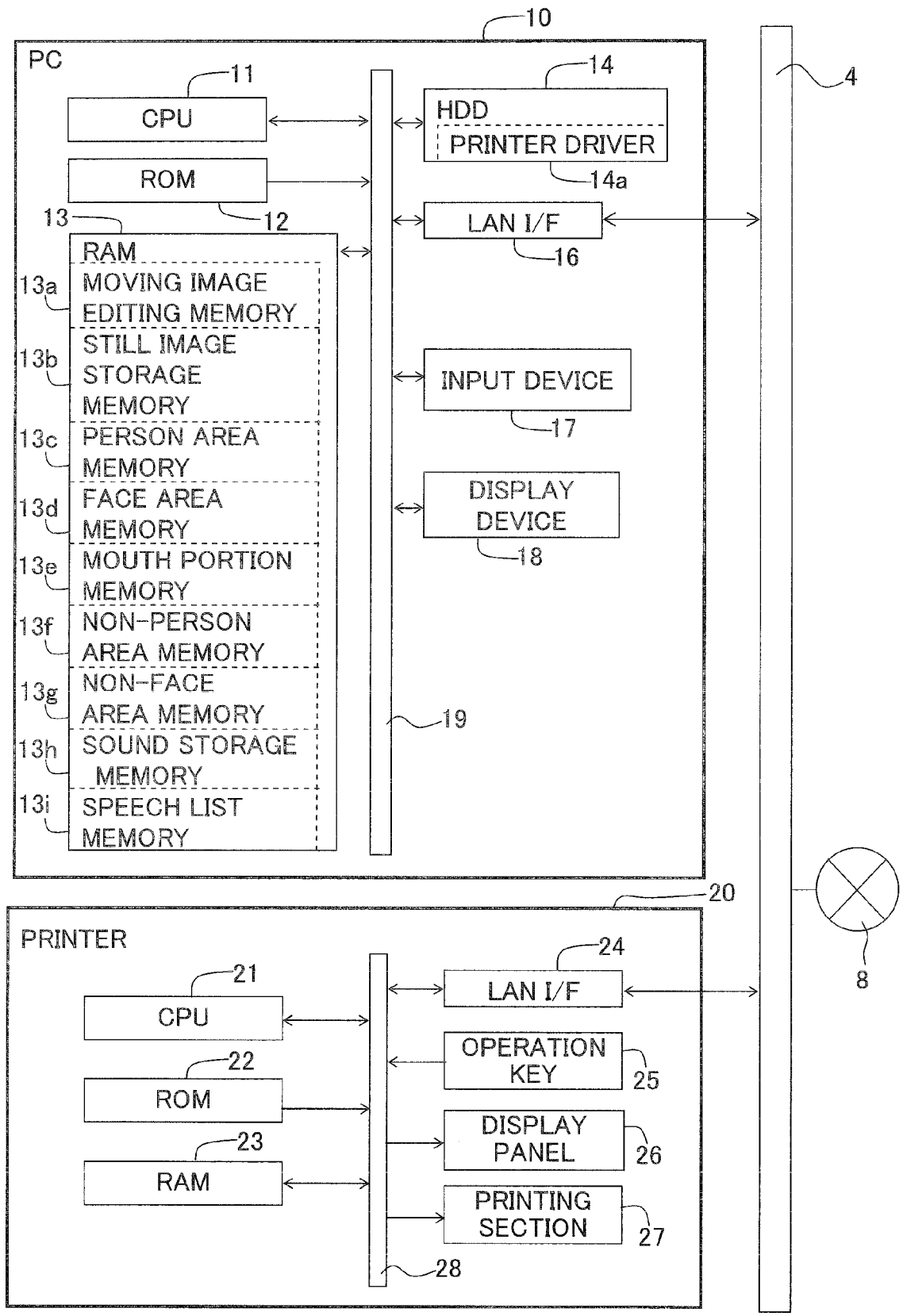
FIG. 1 is a block diagram showing electrical configurations of a PC installed with a printer driver in accordance with a preferred embodiment of the present invention, and a printer connected to the PC.

Hereinbelow, explanations will be made with respect to a preferred embodiment of the present invention in reference to the accompanying drawings.

A PC 10 is an apparatus capable of processing a moving image data, and a sound data to be synchronously played with the moving image. A printer driver 14a in accordance with the embodiment is configured to be capable of generating an image which more clearly expresses the situation at a moving image editing point set by a user in a play-section of the moving image, and causing a printer 20 to print the image.

The PC 10 and the printer 20 are connected via a LAN line 4. Further, the LAN line 4 is connected to the Internet 8 via a router (not shown).

The PC 10 mainly has a CPU 11, a ROM 12, a RAM 13, a hard disk drive 14 (to be referred to as an HDD 14, hereinbelow), a LAN interface 16 (to be referred to as a LAN I/F 16, hereinbelow), an input device 17, and a display device 18. These components are connected each other via a bus line 19.

The CPU 11 controls each portion connected on the bus line 19 according to fixed values and programs stored in the ROM 12 and HDD 14. The ROM 12 is a memory unit in which the fixed values, programs and the like are stored for controlling the operation of the PC 10, and the RAM 13 is a readable and writable (R/W) memory unit for temporarily storing the data and the like needed for processing by the CPU 11.

The RAM 13 is provided with a moving image editing memory 13a, a still image storage memory 13b, a person area memory 13c, a face area memory 13d, a mouth portion memory 13e, a non-person area memory 13f, a non-face area memory 13g, a sound storage memory 13h, and a speech list memory 13i.

The moving image editing memory 13a serves to store a moving image file for processing. Here, the moving image file is a data for reproducing a moving image by sequentially outputting a plurality of still images (frame images), and encoded by a predetermined format such as MPEG format and the like. Further, the moving image file includes a video data for outputting the moving image, an audio data for outputting a sound, and a data for synchronously reproducing the moving image and the sound. Further, the moving image file to be stored in the moving image editing memory 13a may either be read in from the HDD 14 or be acquired from the Internet 8.

The still image storage memory 13b serves to store still image data. A still image data corresponds to a still image forming one scene of the moving image, and is generated from the moving image file stored in the moving image editing memory 13a.

The person area memory 13c serves to store areas occupied by persons appearing on the still image (to be referred to as persons in the still image, hereinbelow) inside the still image (person areas). With respect to each pixel which composes the still image corresponding to the still image data stored in the still image storage memory 13b, the person area memory 13c maintains a value indicating whether or not the pixel composes a person area, and a value indicating whose person area it is.

The face area memory 13d serves to store areas occupied by the faces of the persons in the still image inside the still image (face areas). With respect to each pixel which composes the still image corresponding to the still image data stored in the still image storage memory 13b, the face area memory 13d maintains a value indicating whether or not the pixel composes a face area, and a value indicating whose face area it is.

The mouth portion memory 13e serves to store areas occupied by the mouths of the persons in the still image inside the still image (mouth portions). With respect to each pixel which composes the still image corresponding to the still image data stored in the still image storage memory 13b, the mouth portion memory 13e maintains a value indicating whether or not the pixel composes a mouth portion, and a value indicating whose mouth portion it is.

The non-person area memory 13f serves to store areas not included in the person areas inside the still image. The non-face area memory 13g serves to store areas not included in the face areas inside the still image.

The sound storage memory 13h serves to store audio data extracted from the moving image file stored in the moving image editing memory 13a. The speech list memory 13i serves to store a speech list generated based on the audio data extracted from the moving image file. Further, the speech list will be described hereinafter in reference to FIG. 2B.

The HDD 14 is a hard disk drive to store the printer driver 14a. The printer driver 14a is a program for controlling the printer 20. The CPU 11 executes the printer driver 14a to carry out a speech balloon composite generation process (FIG. 4) which will be described hereinafter.

The LAN I/F 16 serves to connect the PC 10 to the LAN line 4. The input device 17 serves to input instructions and information to the PC 10. The display device 18 displays a variety of information such as a moving image played from the moving image file stored in the moving image editing memory 13a, etc.

The printer 20 mainly has a CPU 21, a ROM 22, a RAM 23, a LAN interface 24 (to be referred to as a LAN I/F 24, hereinbelow), an operation key 25, a display panel 26, and a printing portion 27. These components are connected each other via a bus line 28.

The CPU 21 carries out various processes according to the programs stored in the ROM 22. The ROM 22 is a memory unit which stores the programs and the like to control the operation of the printer 20. The RAM 23 is a readable and writable (R/W) memory unit for temporarily storing the data and the like needed for processing by the CPU 21.

The operation key 25 is an input device for inputting instructions and information to the printer 20. The display panel 26 is a display device capable of displaying a variety of information. The printer 20 drives the printing portion 27 based on a print data inputted via the LAN I/F 24 to form an image based on the print data on a recording medium.

Further, as the printer 20, it is possible to adopt various kinds of printers such as an inkjet printer, an electrophotographic printer, a thermal-transfer printer, and the like.

Next, explanations will be made with respect to the speech balloon composite generation process carried out by the PC 10. When a voice sound of a person is included in the sound to be synchronously played with the moving image, the speech balloon composite generation process converts the voice sound into a text, and combines the text into a still image (frame image) selected from the moving image to generate a composite.

Figures 2A, 2B:
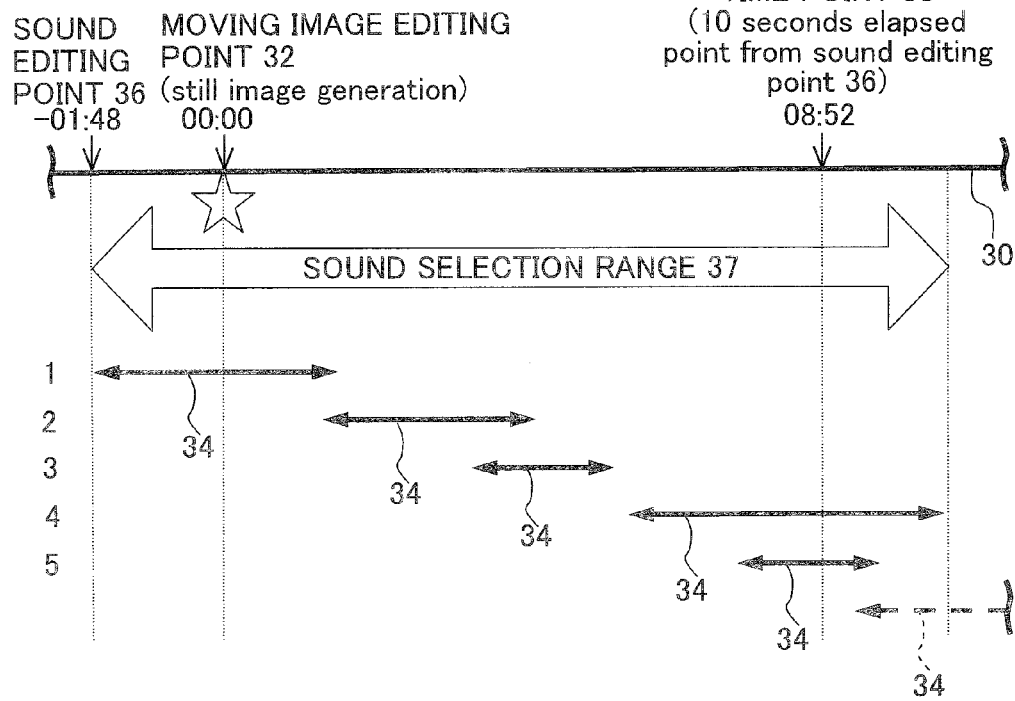
FIG. 2A is a diagram modally showing a play-section of a moving image.
FIG. 2B is a table modally showing a data configuration of a speech list generated in a speech list memory.

Referring to FIG. 2A, explanations will be made with respect to a relationship between a still image selected from the moving image and the selection range for the voice sound to be combined with the still image. The user sets an arbitrary point of time in a moving image play-section 30 as a moving image editing point 32. The PC 10 extracts the still image outputted at the moving image editing point 32 from the moving image among a plurality of still images composing the moving image as a still image selected by the user.

Further, the PC 10 detects a voiced sound section 34 in the moving image play-section 30. Here, the voiced sound section 34 is a section in which a voice sound is included in the sound to be synchronously played in the moving image play-section 30. Further, in the present description, "sound" is utilized as a term including all of the sounds to be played with the moving image, regardless of whether or not it is produced by humans. On the other hand, "voice sound" is utilized as a term referring to that produced especially by humans through the vocal organs in the "sound". Further, in the embodiment, a voiced sound section 34 means a section divided according to each speaker (etterer) and each speech. Further, a voiced sound section 34 is acquired by dividing the voice sound included in the sound with a section with no voice sound detected as the boundary, and dividing the voice sound included in the sound according to each speaker. Therefore, as shown in FIG. 2A, a voiced sound section 34 by one speaker may possibly overlap another voiced sound section 34 by another speaker.

When the moving image editing point 32 set by the user is included in a voiced sound section 34, the PC 10 sets the start point of time of the voiced sound section 34 including the moving image editing point 32 as a sound editing point 36. Then, it selects a range included in a predetermined period of time (10 seconds, for example) from the sound editing point 36 as a sound selection range 37. However, when the point of time at which the predetermined period of time has elapsed (a predetermined period elapsed point of time 38) from the sound editing point 36 is included in another voiced sound section 34, as shown in FIG. 2A, the sound selection range 37 is set to extend up to the end point of time of the voiced sound section 34 including the predetermined period elapsed point of time 38.

FIG. 2B is a table showing a data configuration of the speech list generated in the speech list memory 13i. The speech list serves to convert the voice sound extracted from each voiced sound section 34 included in the sound selection range 37 explained with FIG. 2A into a text to manage the same. The speech list includes a management item 40, a start point of time item 42, a text item 44, an speaker item 46 and an area item 48 as the data items.

The management item 40 stores a management number corresponding to each voiced sound section 34 detected in the moving image play-section 30 (FIG. 2A). A smaller management number is assigned to a voiced sound section 34 closer to the sound editing point 36. The start point of time item 42 stores the start point of time of the voiced sound section 34 corresponding to a management number. Further, when the reproduction time of the moving image editing point 32 is set at the reference of time (zero second), the start point of time indicates the reproduction time of the moving image at the start point of time of each voiced sound section 34. The text item 44 stores the text acquired by converting the voice sound in the voiced sound section 34 corresponding to the management number with a known speech recognition tool. The speaker item 46 stores the speaker of the voice sound detected in the voiced sound section 34 corresponding to the management number. In addition, the method for identifying the speaker of each voice sound will be described hereinafter in reference to FIG. 6A. The area item 48 stores a value indicating the area occupied by each text in the still image in combining the texts stored in the text item 44 into the still image. In particular, the area is calculated by the following equation 1, wherein the designated font refers to a font size predesignated by the user, and each variable stands in units of pixels.

Area=(Character height of designated font)*((Character width of designated font)+(space between characters))*(Character number of the text stored in the text item 44). <Equation 1>

Figure 3:
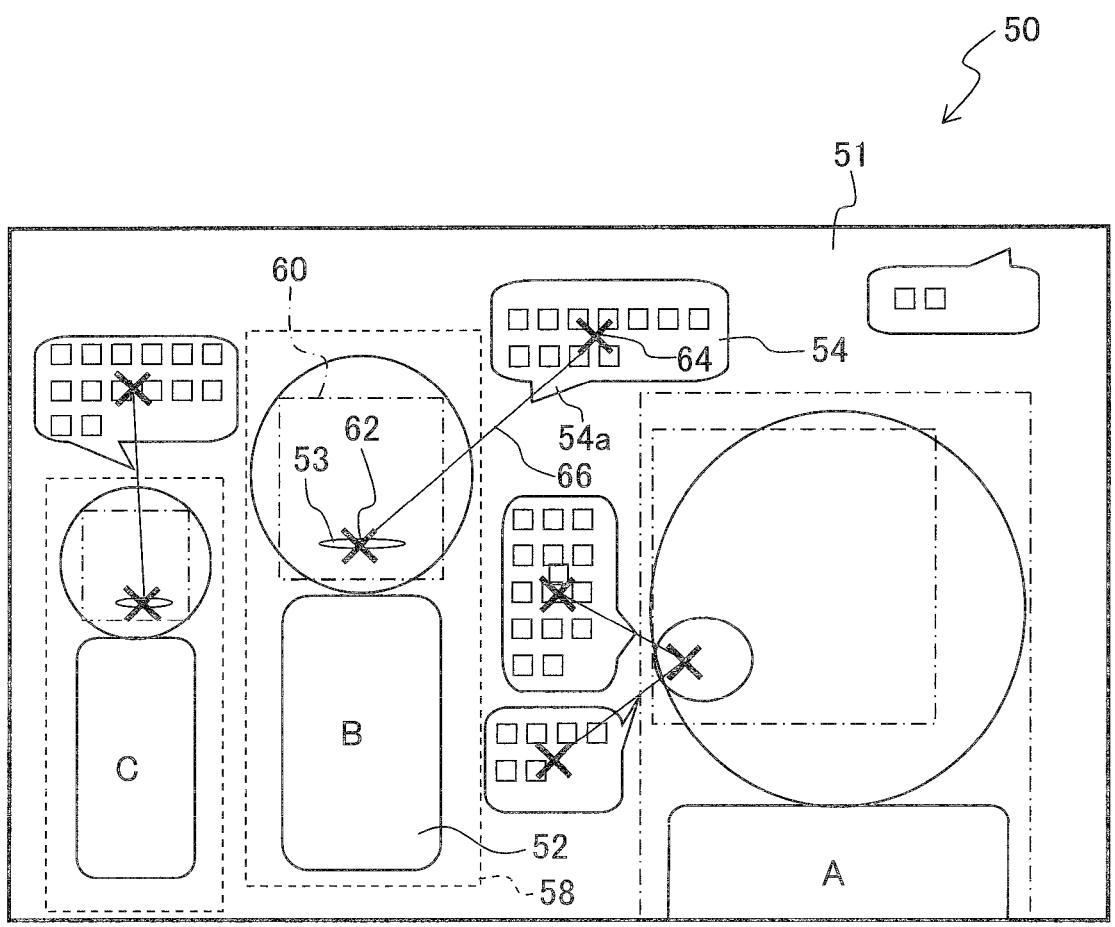
FIG. 3 is a view showing an example of a composite generated by the PC.

FIG. 3 shows a composite 50 generated by combining the texts stored in the speech list (FIG. 2B) into a still image 51 outputted at the moving image editing point 32 (FIG. 2A). Further, in FIG. 3, in order to make the view easy to see, only a part of the components are designated by reference numerals, and repetitive reference numerals are omitted for the same or equivalent components. Further, in FIG. 3, persons in the still image 52 are illustrated simplistically.

As shown in FIG. 3, a speech balloon 54 of such a shape as if blown out from a mouth portion 53 of a person in the still image 52 is combined into the composite 50. The speech balloon 54 is a closed region in which a text is arranged, and provided with a speech balloon vertex 54a indicating the speaker. Each speech balloon 54 is associated with the speaker by the speech balloon vertex 54a.

Each text is combined into the composite 50 in association with the speaker who has produced the voice sound from which the text is originated. In particular, the text based on the person in the still image 52 is combined with the speech balloon 54 blown out from the person in the still image 52. Therefore, it is possible to generate an image in which the association between a person in the still image 52 and the text is visually easy to understand.

On the other hand, the text based on an speaker not included in the persons in the still image 52 is combined with a speech balloon 54 of such a shape as if blown out from the frame of the still image to the inside (the speech balloon shown in the upper right in FIG. 3). Thereby, it is possible to combine even a text based on an speaker not included in the persons in the still image 52 such that the association with the speaker may be visually easy to understand.

In this manner, according to the PC 10, the texts acquired by converting the voice sounds in the sound selection range 37 including the moving image editing point 32 are combined into the still image 51 outputted at the moving image editing point 32. Therefore, it is possible to generate the composite 50 which clearly expresses the situation at the moving image editing point 32.

Further, because each text is arranged inside the speech balloon 54, it is possible to generate a highly entertaining composite 50 as if it were a cartoon frame. Further, according to the composite 50, because it is possible to confirm the conversations recorded in the moving image, it is possible to facilitate recapture of the user's memories better than there is only a still image.

Further, as has been explained in reference to FIG. 2A, when the moving image editing point 32 is included in a voiced sound section 34, the PC 10 sets the start point of time of the voiced sound section 34 as the sound editing point 36. Therefore, the user is able to freely set the moving image editing point 32 in the moving image play-section 30 without concerning about whether or not the point of time is included in the voiced sound section 34, or whether or not it is the start point of time of the voiced sound section 34. That is, no matter what point of time the user sets the moving image editing point 32 at, it is possible to convert the speech into a text from the beginning and combine the text and the still image 51.

Further, in order to facilitate explanations, FIG. 3 also shows some elements which are not actually drawn in the composite 50: person areas 58, face areas 60, speech balloon reference points 62, speech balloon center points 64, and auxiliary lines 66. A person area 58 is the smallest rectangular area including an entire person in the still image 52. A face area 60 is a rectangular area including the face of a person in the still image 52. A speech balloon reference point 62 is set in the mouth portion 53 of a person in the still image 52. A speech balloon center point 64 is positioned at the center of a speech balloon 54.

The PC 10 analyzes the still image data stored in the still image storage memory 13b with a known person recognition tool to recognize the person areas 58, the face areas 60 and the mouth portions 53 inside the still image 51, and stores those areas or positions in the person area memory 13c, the face area memory 13d, and the mouth portion memory 13e, respectively. Further, the speech balloon vertexes 54a of the speech balloons 54 are provided to approach the auxiliary lines 66 which link the speech balloon reference points 62 and the speech balloon center points 64. Each of these elements will be described hereinafter in reference to FIGS. 7A and 7B.

Figure 4:
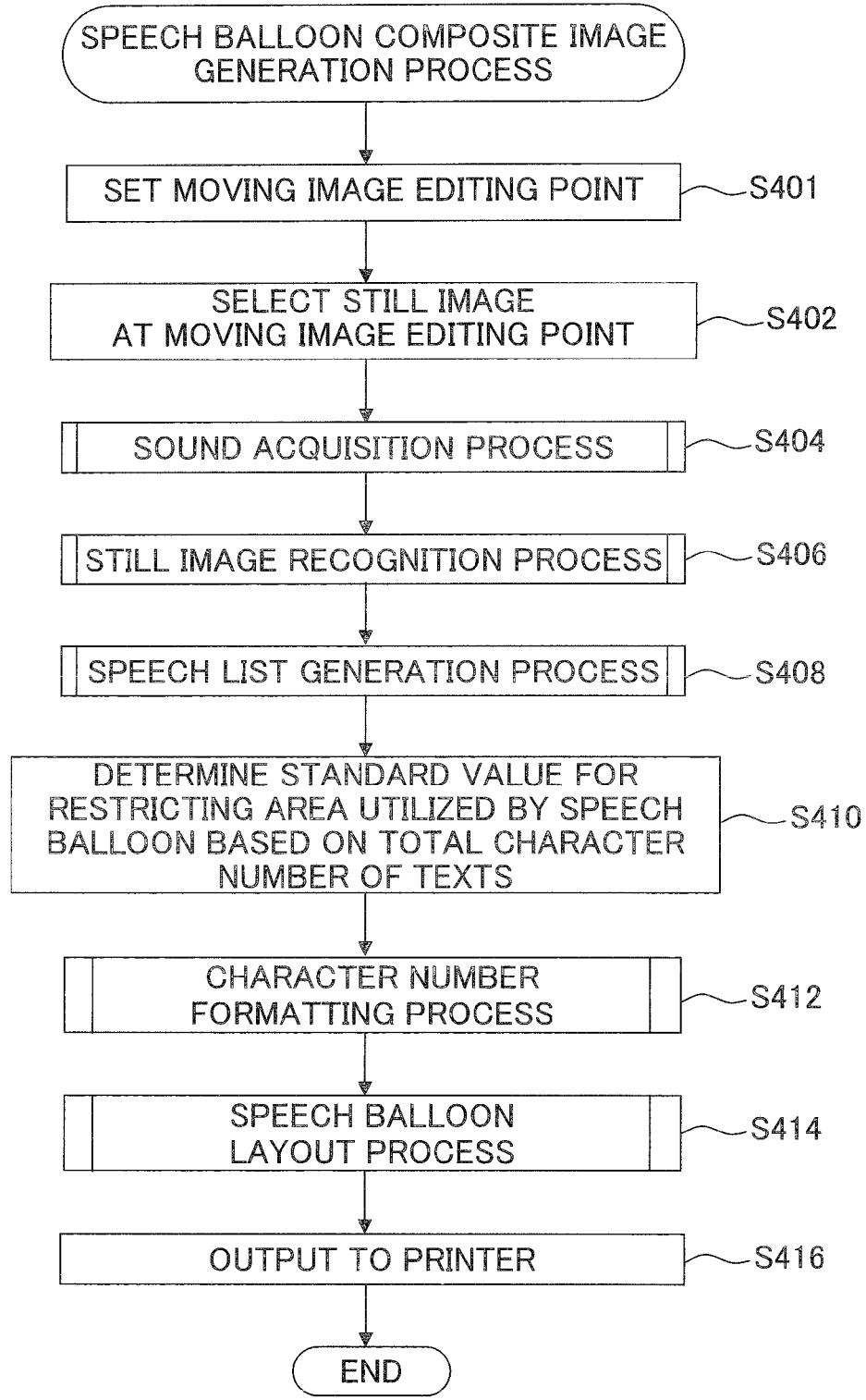
FIG. 4 is a flowchart showing a speech balloon composite generation process carried out by a CPU of the PC.

The process shown by the flowchart of FIG. 4 is to generate the composite 50 (FIG. 3) based on the moving image editing point 32 set by the user. Further, before the process starts, the moving image file for processing is stored in the moving image editing memory 13a.

First, the CPU 11 sets the point of time designated by the user in the moving image play-section 30 as the moving image editing point 32 (FIG. 2A) (S401). Next, the CPU 11 selects the still image outputted at the moving image editing point 32 from a plurality of still images composing the moving image. In particular, the CPU 11 extracts the still image data corresponding to the still image outputted at the moving image editing point 32 from the moving image file, and stores the same in the still image storage memory 13b (FIG. 1) (S402).

Next, the CPU 11 carries out a sound acquisition process (S404) to detect the voiced sound section 34 and set the sound editing point 36 (FIG. 2A). The details of the sound acquisition process will be described hereinafter in reference to FIG. 5A.

Next, the CPU 11 carries out a still image recognition process (S406) to recognize the person areas 58 and the like in the still image 51. The details of the still image recognition process will be described hereinafter in reference to FIG. 5B.

Next, the CPU 11 carries out a speech list generation process (S408) to generate the speech list (FIG. 2B). The details of the speech list generation process will be described hereinafter in reference to FIG. 6A.

Next, the CPU 11 determines a standard value for restricting the area to be utilized by the speech balloons 54 based on the total character number of the texts stored in the speech list (S410). In particular, the CPU 11 determines a standard value "Ypixel" for restricting the area to be utilized by the speech balloons 54 based on the resolution of the still image 51 and the total character number of the texts stored in the speech list. Here, the total character number of the texts refers to the value of totalizing all character numbers of the respective texts stored in the text item 44 of the speech list.

Next, the CPU 11 carries out a character number formatting process (S412) to restrict the character number of each text based on the determined standard value "Ypixel". The details of the character number formatting process will be described hereinafter in reference to FIG. 6B.

Next, the CPU 11 carries out a speech balloon layout process (S414) to set the speech balloons 54. The details of the speech balloon layout process will be described hereinafter in reference to FIGS. 7A and 7B.

Next, the CPU 11 generates a print data for the composite 50 based on the still image data stored in the still image storage memory 13b, the texts the character numbers of which have been restricted in the character number formatting process (S412), and the arrangement of each speech balloon 54 decided in the speech balloon layout process (S414). Then, it outputs the generated print data to the printer 20 (S416), and ends the process.

On the other hand, the printer 20 carries out printing based on the print data received from the PC 10 to form the composite 50 on a recording medium to visualize the same.

Figure 5A:
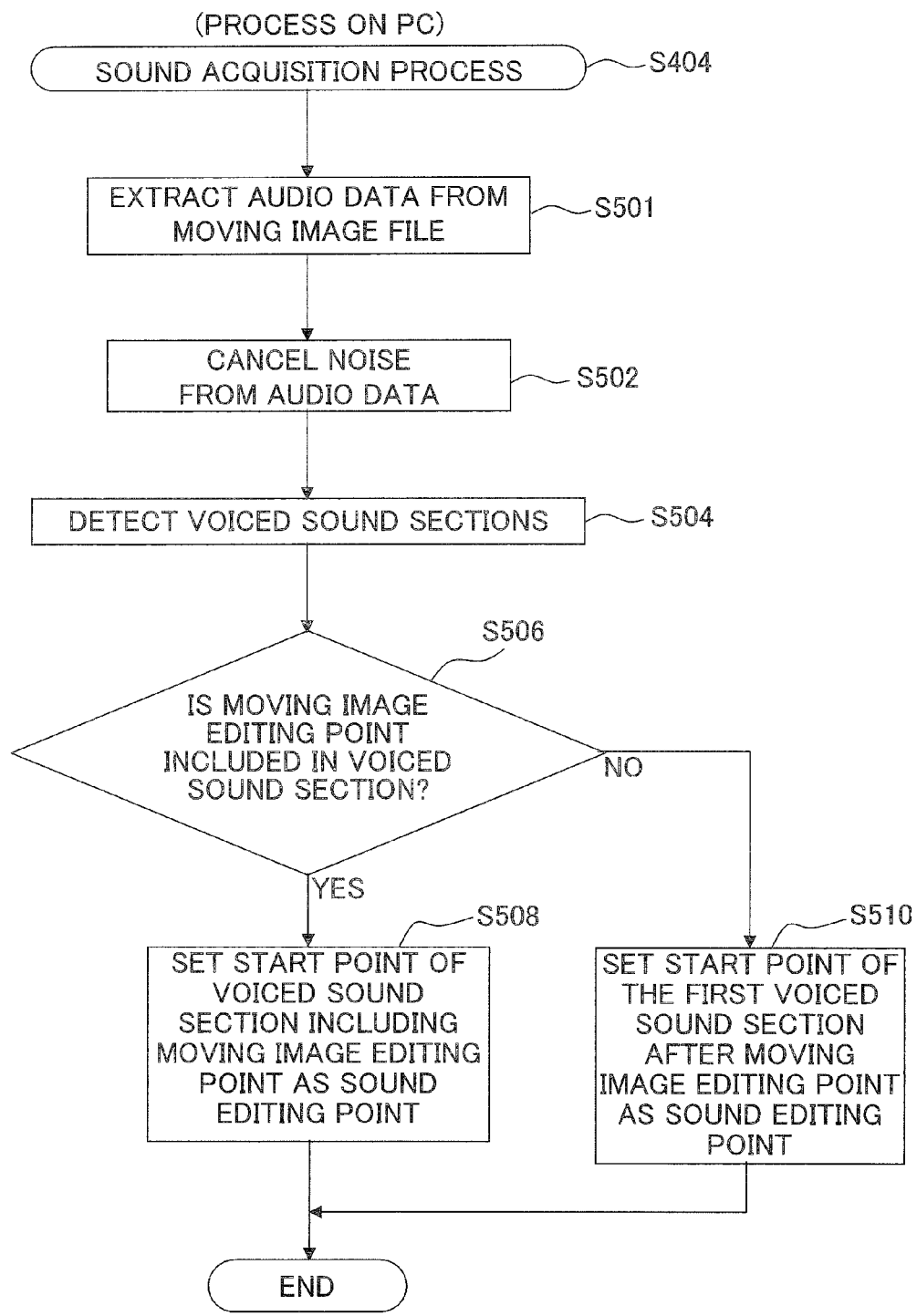
FIG. 5A is a flowchart showing a sound acquisition process carried out by the CPU of the PC.

The process shown by the flowchart of FIG. 5A is to set the sound editing point 36 based on the moving image editing point 32.

First, the CPU 11 extracts the audio data from the moving image file, and stores the same in the sound storage memory 13h (S501). Next, the CPU 11 denoises or cancels noise from the audio data (S502), and then analyzes the audio data with a known audio analysis tool to detect the voiced sound sections 34 in the moving image play-section 30 (FIG. 2A) (S504). In particular, it divides the voice sound included in the sound with sections with no voice sound detected as the boundaries and, furthermore, divides the voice sound included in the sound according to each speaker. By virtue of this, it detects the voiced sound sections 34 divided according to each speaker and each speech in the moving image play-section 30. Further, for use in the succeeding processes, the CPU 11 extracts the corresponding audio data according to each voiced sound section 34 and stores the extracted audio data in such as the RAM 13.

Next, the CPU 11 determines whether or not the moving image editing point 32 is included in a voiced sound section 34 (S506). Next, if it is determined that the moving image editing point 32 is included in a voiced sound section 34 (S506: Yes), then among the voiced sound sections 34, the CPU 11 sets the start point of time of the voiced sound section 34 including the moving image editing point 32 as the sound editing point 36 (S508).

On the other hand, if it is determined that the moving image editing point 32 is not included in any voiced sound section 34 (S506: No), then the CPU 11 sets the start point of time of the first voiced sound section 34 after the moving image editing point 32 as the sound editing point 36 (S510).

According to the sound acquisition process (S404), even if the user freely sets the moving image editing point 32, it is still possible to set the sound editing point 36 at the start point of time of a voiced sound section 34.

The still image recognition process shown by the flowchart of FIG. 5B is to recognize the person areas 58 and the like inside the still image 51.

First, the CPU 11 analyzes the still image data stored in the still image storage memory 13b with a known person recognition tool to recognize the persons in the still image 52 appearing on the still image 51 (S522). Next, with respect to each of the persons in the still image 52, the CPU 11 identifies the person area 58, the face area 60 and the mouth portion 53, and stores the same in the person area memory 13c, the face area memory 13d and the mouth portion memory 13e, respectively (S524).

Next, the CPU 11 identifies the area not including the person areas 58 inside the still image 51 as the non-person area, and stores the same in the non-person area memory 13*f* (S526). Further, the CPU 11 identifies the area not including the face areas 60 as the non-face area, and stores the same in the non-face area memory 13*g* (S527). Next, the CPU 11 determines areas of a predetermined size or larger in the non-person area or the non-face area as speech balloon arrangeable areas (S528). Next, the CPU 11 calculates the size of each speech balloon arrangeable area (S530), and ends the process.

According to the still image recognition process, it is possible to determine the speech balloon arrangeable areas in areas away from the person areas 58 or the face areas 60 inside the still image 51.

Figure 6A:
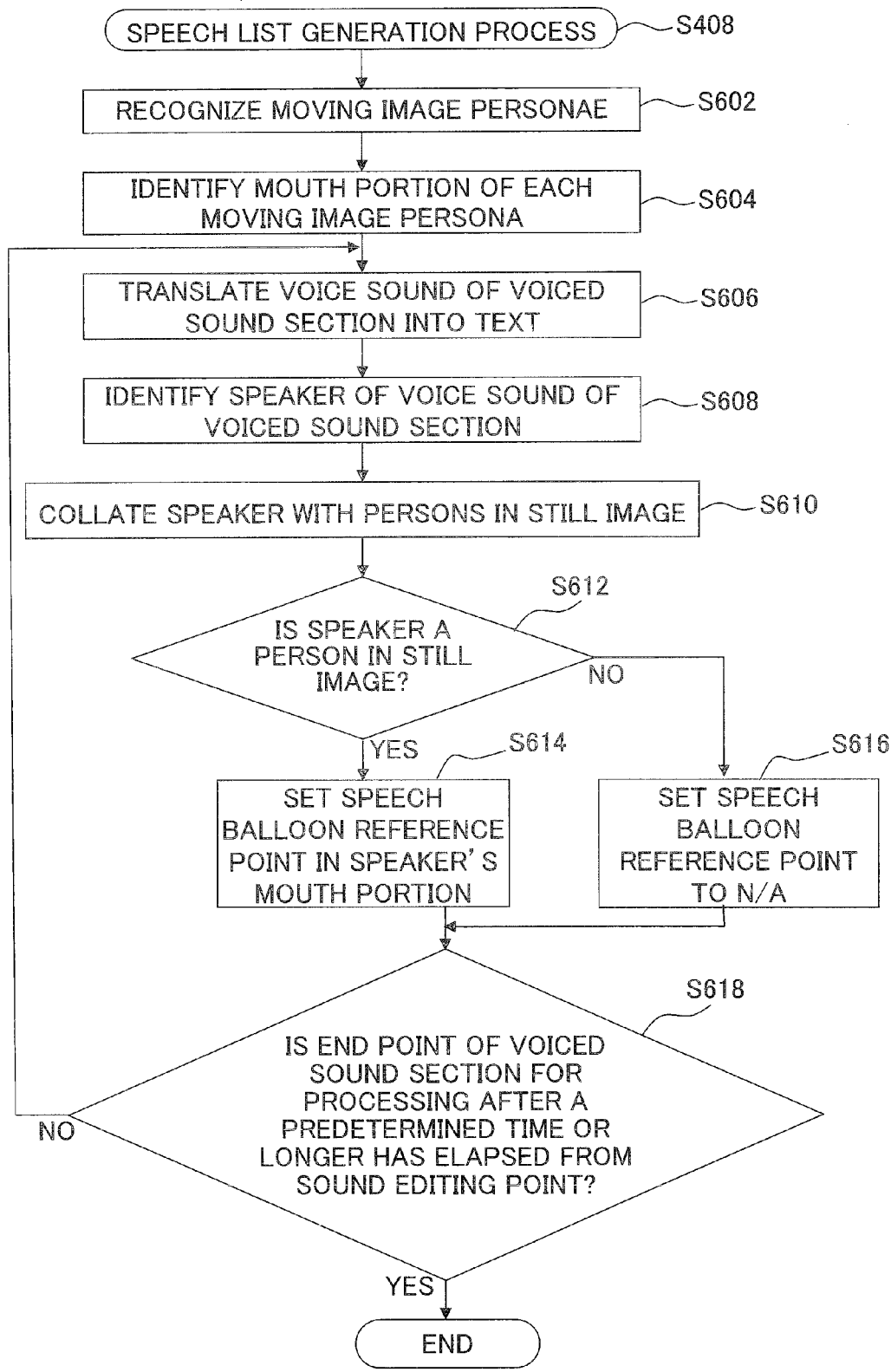
FIG. 6A is a flowchart showing a speech list generation process carried out by the CPU of the PC.

The process shown by the flowchart of FIG. 6A is to generate the speech list (FIG. 2B).

First, the CPU 11 analyzes the moving image file with a known person recognition tool to recognize the persons appearing on the moving image (moving image personae) (S602).

Next, the CPU 11 identifies the mouth portion 53 of the person in the still image 52 with respect to each moving image persona (S604). For example, when four members A, B, C, and D are recognized as the moving image personae and three members are included in the still image 51 as the persons in the still image, first, each moving image persona is collated with the persons in the still image 52. Then, if a person in the still image 52 is recognized as corresponding to the moving image persona A, for example, the mouth portion 53 of the person in the still image 52 is identified as the mouth portion 53 of the persona A. Further, if no person in the still image 52 is identified as corresponding to the moving image persona D, for example, the persona D is determined as a person who appears on the moving image but does not appear on the selected still image 51. Therefore, in this case, no mouth portion 53 is identified for the persona D.

Next, the CPU 11 acquires the audio data corresponding to one voiced sound section 34 from the RAM 13, converts the audio data with a known speech recognition tool to translate the voice sound of the voiced sound section 34 into a text, associates the text with the management number of the voiced sound section 34, and stores the same in the text item 44 of the speech list (S606).

Next, the CPU 11 identifies the speaker of the voice sound of the voiced sound section 34 for processing, associates the speaker with the management number of the voiced sound section 34, and stores the same in the speaker item 46 of the speech list (S608). The speaker identification is, for example, carried out in the following manner. The PC 10 is able to acquire a voiceprint data indicating the voiceprint of each moving image persona in advance by analyzing the audio data. Therefore, when the voiceprint data is acquired in advance with respect to each moving image persona, the CPU 11 is able to collate the voiceprint data of the voice sound of the voiced sound section 34 for processing with the prestored voiceprint data to identify the speaker. Further, the CPU 11 may also identify the moving image persona whose mouth portion is moving on the moving image of the voiced sound section 34 as the speaker.

Next, the CPU 11 collates the identified speaker with the persons in the still image 52 (S610) to determine whether or not the speaker is included in the persons in the still image 52, that is, whether or not the speaker produces the voice sound of a person in the still image 52 (S612). If the determination of the step S612 is positive (S612: Yes), that is, if there is a person in the still image 52 determined to be the same person as the speaker, then the CPU 11 sets the speech balloon reference point 62 in the mouth portion 53 of the person in the still image 52 (S614). Further, the CPU 11 associates the set speech balloon reference point 62 with the text and stores the same in such as the RAM 13.

On the other hand, if the determination of the step S612 is negative (S612: No), that is, the speaker is determined as not included in the persons in the still image 52, then the CPU 11 sets the speech balloon reference point 62, which will be associated with the text and stored in the RAM 13 or the like, to N/A (S616).

Next, the CPU 11 determines whether or not the end point of time of the voiced sound section 34 for processing is after a predetermined period of time or longer has elapsed from the sound editing point 36 (S618). If the determination of the step S618 is negative (S618: No), then the CPU 11 selects the next voiced sound section 34 for processing, and repeats the process from the step S606. Then, when the determination of the step S618 becomes positive in repeating the process (S618: Yes), the CPU 11 ends the speech list generation process.

According to the speech list generation process, it is possible to convert the voice sounds to be played after the sound editing point 36 into texts and extract the converted text. Further, when the predetermined period elapsed point of time 38 after a predetermined period of time has elapsed from the sound editing point 36 (FIG. 2A) is included in a voiced sound section 34, it is possible to convert the voice sound up to the end point of time of the voiced sound section 34 including the predetermined period elapsed point of time 38 into a text and extract the converted text.

Figure 6B:
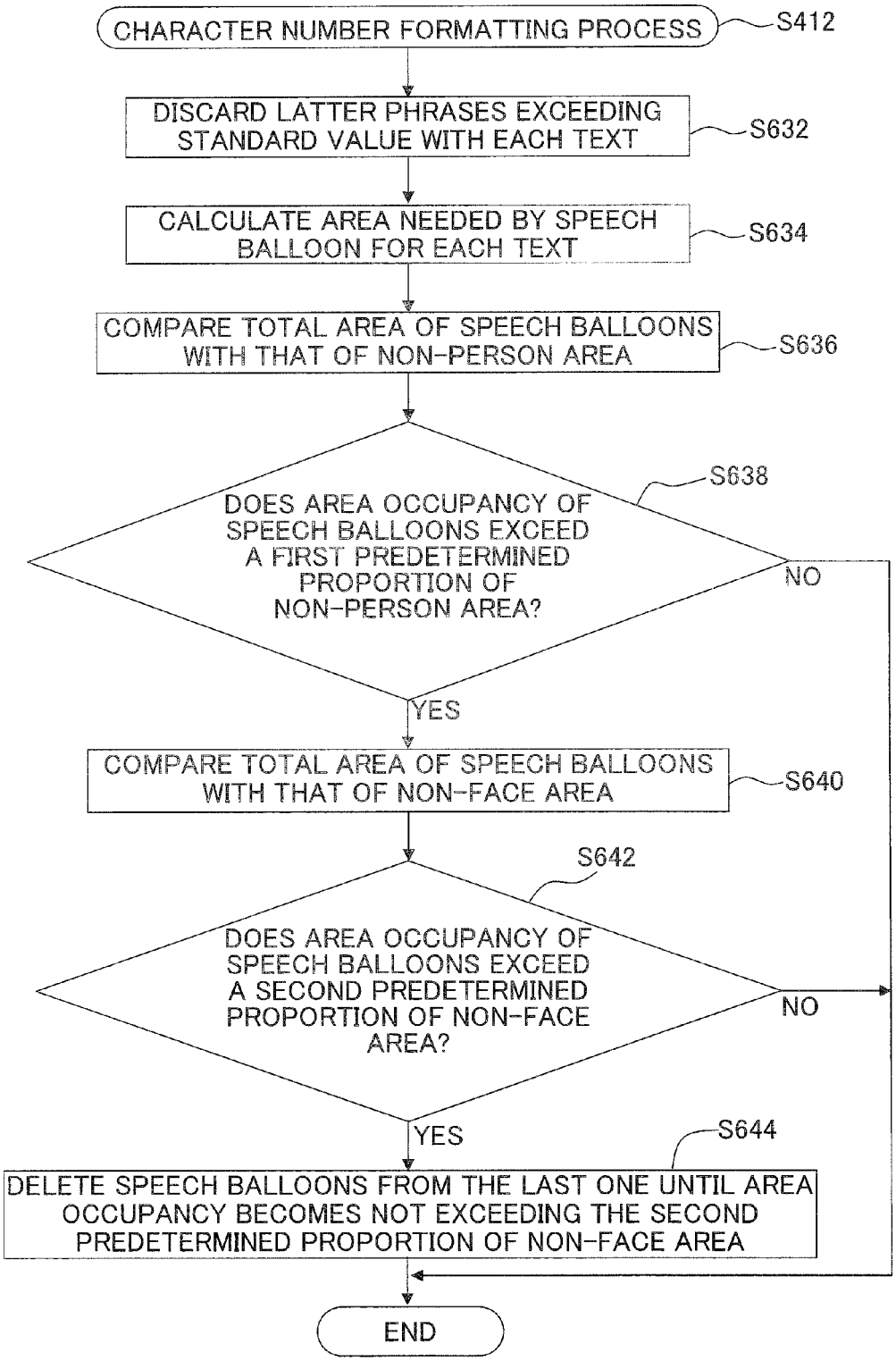
FIG. 6B is a flowchart showing a character number formatting process carried out by the CPU of the PC.

The character number formatting process shown by the flowchart of FIG. 6B is to restrict the character number of each text so that the text extracted according to each voice sound may not exceed a predetermined character number, respectively.

First, the CPU 11 divides each text stored in the text item 44 of the speech list according to each phrase, and discards the latter phrases which come to exceed the standard value "Ypixel" determined in the process of the step S410 (FIG. 4) (S632). Further, marks such as " . . . " may be added to the end of the text after discarding the phrases to indicate that the character number of the text has been restricted.

Next, the CPU 11 calculates the value expressing the area in pixels occupied by each text inside the still image 51 based on the aforementioned equation 1 and stores the calculated value in the area item 48 of the speech list according to each management number (S634). At the time, the value stored in the area item 48 of the speech list is equivalent to the area or size needed for the speech balloon 54 for each text.

Next, the CPU 11 compares the total area of the speech balloons 54 with that of the non-person area (S636). Here, the total area of the speech balloons 54 is calculated as the sum total of the values stored in the area item 48. Then, the CPU 11 determines whether or not the area occupancy of the speech balloons 54 exceeds a first predetermined proportion of the non-person area (S638). For example, it determines whether or not the area occupancy of the speech balloons 54 exceeds 70% of the non-person area. If the determination of the step S638 is negative (S638: No), then the CPU 11 ends the character number formatting process.

On the other hand, if the determination of the step S638 is positive (S638: Yes), then the CPU 11 compares the total area of the speech balloons 54 with that of the non-face area (S640). Then, the CPU 11 determines whether or not the area occupancy of the speech balloons 54 exceeds a second predetermined proportion of the non-face area (S642). For example, it determines whether or not the area occupancy of the speech balloons 54 exceeds 50% of the non-face area. If the determination of the step S642 is negative (S642: No), then the CPU 11 ends the character number formatting process.

On the other hand, if the determination of the step S642 is positive (S642: Yes), then the CPU 11 deletes the speech balloons 54 from the last one until the area occupancy of the speech balloons 54 becomes equal to or below the second predetermined proportion of the non-face area (S644). For example, the CPU 11 deletes the speech balloons 54 from the last one until the area occupancy of the speech balloons 54 becomes equal to or below 50% of the non-face area. In particular, the CPU 11 deletes the information in descending order of the management number among that of every voiced sound section 34 stored in the speech list. That is, the CPU 11 deletes the information stored in the speech list from the latest reproduction time. In this manner, it is possible to preferentially preserve texts corresponding to voice sounds closer to the moving image editing point 32.

Then, the CPU 11 ends the character number formatting process. According to the character number formatting process, because the character number of each text is restricted, the texts restricted in character number are combined into the still image 51. Therefore, it is possible to restrain the still image from becoming complicated due to the lengthy texts. Further, because it is possible to restrict the number of speech balloons until the area occupancy of the speech balloons 54 becomes equal to or below a predetermined value, it is possible to restrain the persons in the still image 52 from hiding behind the speech balloons.

Figure 7A:
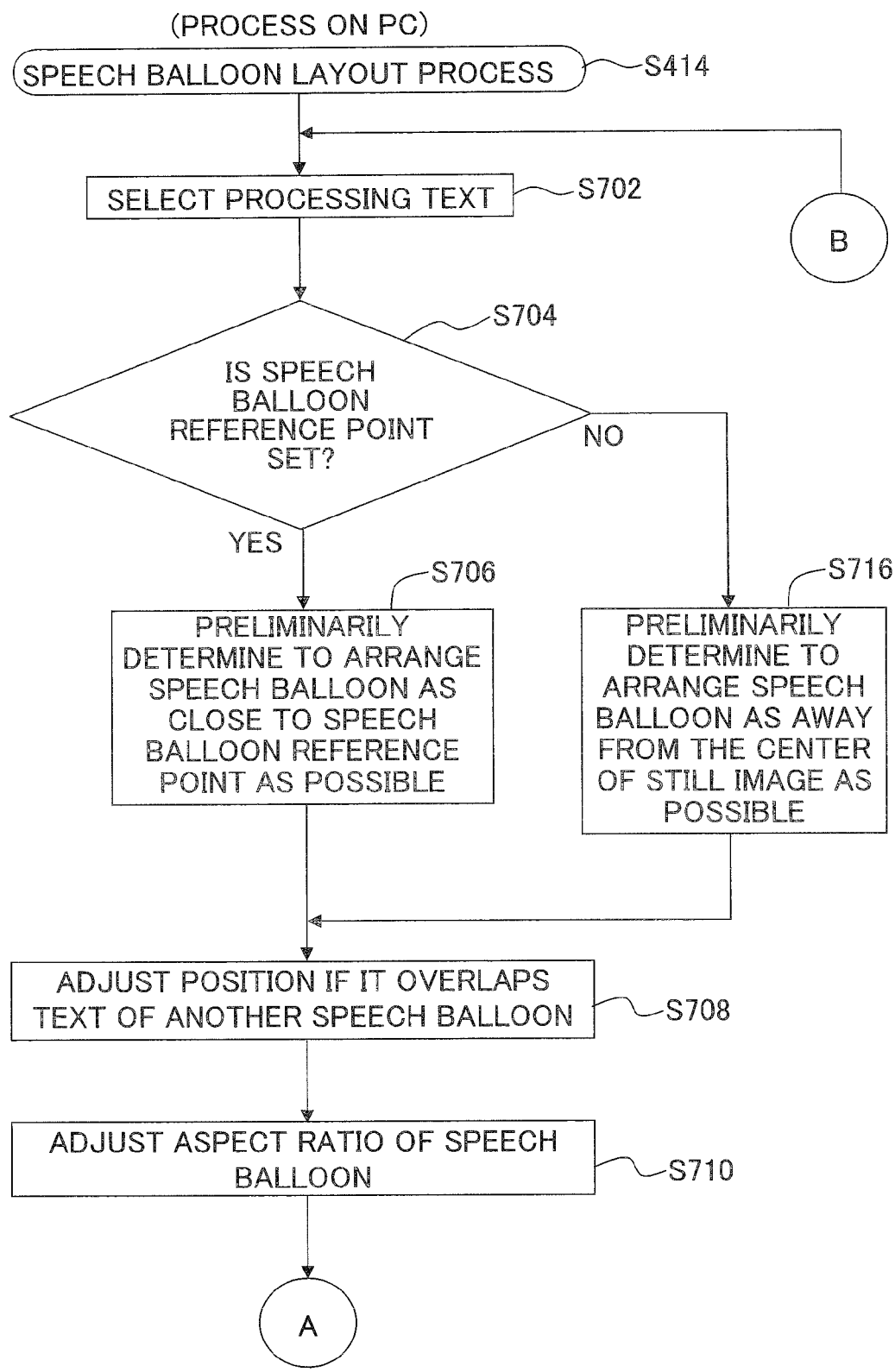
FIGS. 7A and 7B are flowcharts showing a speech balloon layout process carried out by the CPU of the PC.
Figure 7B:
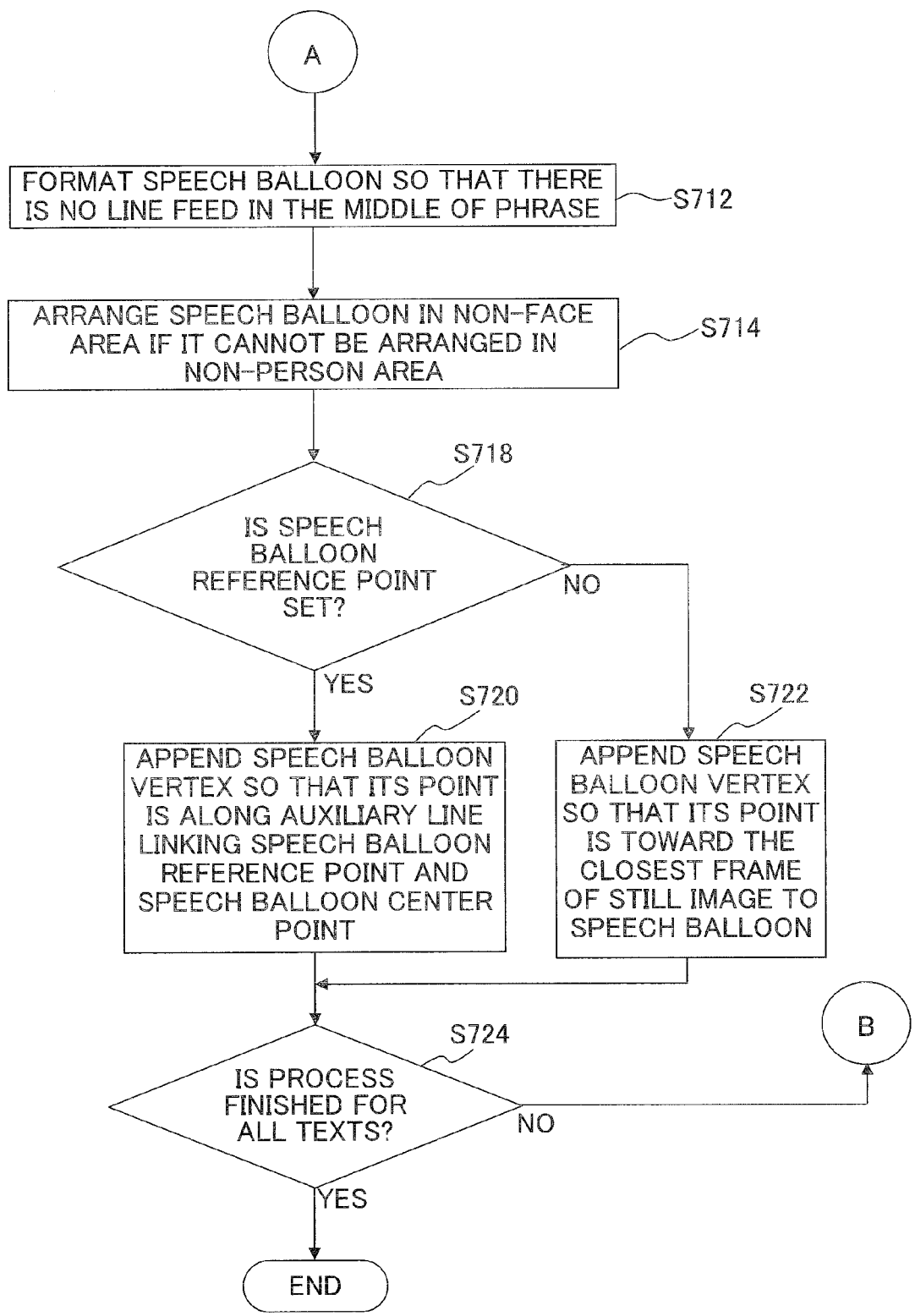

The speech balloon layout process shown by the flowcharts of FIGS. 7A and 7B is to set the speech balloons 54.

First, the CPU 11 selects the processing text from the respective texts stored in the speech list (S702). Next, it determines whether or not the speech balloon reference point 62 is set for the processing text (S704). As described hereinbefore, when the speaker of the processing text is the same person as a person in the still image 52, the speech balloon reference point 62 for the processing text is set in the mouth portion 53 of the person in the still image 52. Further, the speech balloon reference point 62 set for the processing text is prestored in the RAM 13 and the like in the speech list generation process described hereinbefore (FIG. 6A).

Therefore, if the speech balloon reference point 62 is set for the processing text (S704: Yes), first, the CPU 11 preliminarily determines to arrange the speech balloon 54 as close to the speech balloon reference point 62 as possible in the non-person area (S706). In particular, it preliminarily determines to arrange the speech balloon 54 in a speech balloon arrangeable area which is determined in the process of the step S528 (FIG. 5B), equal to or larger than the area to be occupied by the processing text (that is, the area stored in the area item 48), and as close to the speech balloon reference point 62 as possible.

Next, if the preliminarily determined speech balloon 54 overlaps the text inside another speech balloon 54, the CPU 11 adjusts the preliminarily determined position (S708). Next, the CPU 11 adjusts the aspect ratio of the speech balloon 54 (S710). In particular, the aspect ratio of the speech balloon 54 is adjusted so that the width of the speech balloon 54 may become twice as long as or longer than the height of the speech balloon 54. Further, if the width of the speech balloon 54 cannot become twice as long as or longer than the height, the CPU 11 preliminarily determines to arrange the speech balloon 54 in another speech balloon arrangeable area.

Next, the CPU 11 formats the speech balloon 54 so that the text may not insert any line feed in the middle of a phrase (S712). Then, if it is not possible to arrange the speech balloon 54 in the non-person area in the process from the step S706 to the step S712, the CPU 11 arranges the speech balloon 54 in the non-face area (S714). However, if the speech balloon 54 is successfully arranged in the non-person area in the process from the step S706 to the step S712, the CPU 11 skips over the process of the step S714 to the process of the step S718. That is, it arranges the speech balloon 54 in the non-person area. Further, in the case of arranging the speech balloon 54 in the non-face area too, in the same manner as described in the process from the step S706 to the step S712, the CPU 11 preliminarily determines to arrange the speech balloon 54 in a speech balloon arrangeable area as close to the speech balloon reference point 62 as possible. If the preliminarily determined speech balloon 54 overlaps the text inside another speech balloon 54, the CPU 11 adjusts the preliminarily determined position. Then, the aspect ratio of the speech balloon 54 is adjusted so that the width of the speech balloon 54 may become twice as long as or longer than the height, and the speech balloon 54 is formatted so that the text may not insert any line feed in the middle of a phrase. Illustrations and detailed explanations will be omitted for those adjustments.

On the other hand, if the speech balloon reference point 62 is not set for the processing text (S704: No), the CPU 11 preliminarily determines to arrange the speech balloon 54 as away from the center of the still image 51 as possible (S716). In particular, the CPU 11 determines to arrange the speech balloon 54 in a speech balloon arrangeable area which is determined in the process of the step S528 (FIG. 5B), equal to or larger than the area to be occupied by the processing text (that is, the area stored in the area item 48), and as away from the center of the still image 51 as possible. Next, with respect to the text for which the speech balloon reference point 62 is not set, in the same manner, the CPU 11 also carries out the process from the step S708 to the step S714 to determine the arrangement of the speech balloon 54.

Next, the CPU 11 determines whether or not the speech balloon reference point 62 is set for the processing text (S718). If the determination of the step S718 is positive (S718: Yes), then the CPU 11 appends the speech balloon vertex 54a so that the point of the speech balloon vertex 54a may be along the auxiliary line 66 (FIG. 3) linking the speech balloon reference point 62 and the speech balloon center point 64 (that is, the point positioned at the center of the speech balloon 54 arranged by the determination made from the step S706 to the step S714) (S720).

On the other hand, if the determination of the step S718 is negative (S718: No), then the CPU 11 appends the speech balloon vertex 54a so that the point of the speech balloon vertex 54a may be toward the closest frame of the still image 51 to the speech balloon 54 (S722). That is, the CPU 11 sets the speech balloon 54 of such a shape as if blown out from the frame of the still image 51 to the inside.

Next, the CPU 11 determines whether or not the process is finished for all of the texts stored in the speech list (S724). If the determination of the step S724 is negative (S724: No), then the CPU 11 repeats the process from the step S702. On the other hand, if the determination of the step S724 is positive (S724: Yes), then the CPU 11 ends the speech balloon layout process.

As has been explained in reference to FIG. 4, the CPU 11 generates a print data to combine each text with the speech balloon 54 determined for the text and outputs the print data to the printer 20 (S416).

Therefore, by carrying out the speech balloon composite generation process of the embodiment, the PC 10 is able to combine the texts based on the persons in the still image 52 with the speech balloons 54 of such a shape as if blown out from the persons in the still image 52. On the other hand, it is possible to combine the texts based on speakers not included in the persons in the still image 52 with the speech balloons 54 of such a shape as if blown out from the frame of the still image 51 to the inside. As a result, it is possible to generate the composite 50 in which the relationship between each speaker and the text is visually easy to understand. Further, because the character number of each text is restricted, it is possible to restrain the still image from becoming difficult to see due to the combined texts.

Further, because the text is combined with a different speech balloon 54 according to each speaker and each speech, it is possible to combine the text in a separated form according to each speaker and each speech to facilitate easiness for the user to read.

In the above embodiment, the PC 10 corresponds to an example of a computer or an information processing apparatus, and the printer driver 14a corresponds to an example of an information processing program. Further, in the above embodiment, the CPU 11 carrying out the speech balloon composite generation process shown in FIG. 4 corresponds to an example of a combination mechanism. The CPU 11 carrying out the process of the step S401 corresponds to an example of a moving image editing point setting mechanism. The CPU 11 carrying out the process of the step S402 corresponds to an example of a still image selection mechanism. The CPU 11 carrying out the process of the step S412 corresponds to an example of a character number restriction mechanism. The CPU 11 carrying out the process of the step S414 corresponds to an example of a text area setting mechanism. The CPU 11 carrying out the process of the step S504 corresponds to an example of a sound detection mechanism, a first division mechanism, and a second division mechanism. The CPU 11 carrying out the process of the step S506 corresponds to an example of a moving image editing point determination mechanism. The CPU 11 carrying out the processes of the steps S508 and S510 corresponds to an example of a sound editing point setting mechanism. The CPU 11 carrying out the process of the step S522 corresponds to an example of a person recognition mechanism for the still image. The CPU 11 carrying out the process of the step S606 corresponds to an example of a text extraction mechanism. The CPU 11 carrying out the process of the step S608 corresponds to an example of an speaker identification mechanism. The CPU 11 carrying out the process of the step S610 corresponds to an example of a collation mechanism.

While the present invention is described hereinabove on the basis of the embodiment, it could be easily inferred that the present invention is by no means limited to the above embodiment and that various modifications and changes are possible without departing from the true spirit and scope of the present invention.

For example, in the above embodiment, the PC 10 corresponds to an example of a computer or an information processing apparatus, and the printer driver 14a corresponds to an example of an information processing program. However, if the printer 20 is configured to be capable of processing a moving image file, the present invention may also be applied with the CPU 21 of the printer 20 as an example of a computer or an information processing apparatus, and the control program installed in the printer 20 as an example of an information processing program.

Further, in the above embodiment, the PC 10 is described as an example of a computer or an information processing apparatus. However, various apparatuses such as cell-phones, computerized game machines, digital cameras, and the like may serve as an example of a computer or an information processing apparatus.

Further, in the above embodiment, the PC 10 generates the composite 50, and visualizes the same by outputting the composite 50 to the printer 20 to print the same. However, it is also possible to apply the present invention to the case of visualizing the composite 50 by outputting the composite 50 to the display device 18 to display the same. Further, it is also possible to apply the present invention to the case of transmitting the generated composite 50 to another apparatus without visualizing the same.

Further, in the above embodiment, the voice sound is converted into a text according to each voiced sound section 34. Instead of that, it may also be configured such as to once convert all the voice sounds extracted from the moving image into texts, then extract the text according to each voiced sound section 34 from the converted texts, and store the extracted text in the speech list.

Further, in the above embodiment, the aspect of the speech balloon 54 (such as the color and shape) may also vary with each speaker. For example, the aspect of the speech balloon 54 may be vary in accordance with the sex or the age of the speaker. In this manner, it is possible to generate the composite 50 in which the relationship between an speaker and the text is visually easy to understand.

Further, in the above embodiment, provided that the voice sound is analyzed according to each voiced sound section 34 and the CPU 11 (an example of a classification mechanism) carries out a process to classify each voice sound based on the analysis, the aspect of the speech balloon 54 (such as the color and shape) may also vary with each classification. For example, the text based on the voice sound produced by a loud voice may be combined with a speech balloon 54 shaped to have a jagged contour and, on the other hand, the text based on the voice sound produced by a low voice may be combined with a comparatively small speech balloon 54. Further, if it is possible to presume the speaker's emotion by analyzing each voice sound, then by classifying each voice sound according to the speaker's emotion based on the analysis, the aspect of the speech balloon 54 may also vary with each classification. In this manner, it is possible to generate the composite 50 which more clearly expresses the situation on the moving image according to a predetermined timing.

Further, by presuming the emotion from the expression of a person in the still image 52, the aspect of the speech balloon 54 may also vary with each emotion.

Further, by classifying the voice sound according to each speaker and each speaker's emotion, the aspect of the speech balloon 54 may also vary with each classification.

Further, in the above embodiment, the voiced sound sections 34 refer to sections divided according to each speaker and each speech. Instead of that, it may also be configured such as to detect whether or not there is a voice sound, determine any section with one speaker's voice sound or more as a voiced sound section and any section with no voice sound as an unvoiced sound section, and divide the sound with the unvoiced sound section as the boundary.

Further, in the above embodiment, a speech balloon 54 associates an speaker with the text. However, it may also be configured so as to associate an speaker with the text in the composite 50 by combining the text to which the speaker's name is added into the still image 51.

Further, in the above embodiment, the standard value "Ypixel" for restricting the area to be utilized by the speech balloons 54 is determined based on the total character number of the texts stored in the speech list. However, it may also be a predetermined fixed value.

Further, in the above embodiment, the explanations were made with the case of setting one moving image editing point 32 in the moving image play-section 30. However, it is also possible to apply the present invention to the case of setting a plurality of moving image editing points 32 in the moving image play-section 30. In such case, it is possible to generate a plurality of composites 50 expressing a temporal change like a cartoon formed of a plurality of frames by generating the composite 50 according to each set moving image editing point 32 by the method of the above embodiment.

Further, in the above embodiment, the start point of time of a voiced sound section 34 is set as the sound editing point 36. However, it may also be configured such as to set a point of time which is, for example, earlier than the start point of time of the voiced sound section 34 by a predetermined period of time as the sound editing point 36.

What is claimed is:

1. A non-transitory computer readable medium, storing an information processing program therein which is to be executed on a computer in which a processing for a stored moving image and a processing for a stored sound to be synchronously played with the moving image are executed,
wherein the information processing program causes the computer to execute as a plurality of units including:
a moving image editing point setting unit which is configured to set, as a moving image editing point for a moving image, a point of time included in a play-section of the moving image,
wherein the point of time set as the moving image editing point by the moving image editing point setting unit is at a time subsequent to storage of the moving image;
a still image data extraction unit which is configured to extract a still image data corresponding to an image outputted at the moving image editing point set by the moving image editing point setting unit;
a moving image editing point determination unit which is configured to determine whether or not the moving image editing point set by the moving image editing point setting unit is within a voiced sound section,
wherein the voiced sound section is a section in which a voice sound is within the sound to be synchronously played with the moving image and which includes a voiced sound start point as a start point of the voiced sound section and a voiced sound end point as an end point of the voiced sound section;
a sound acquire unit which is configured to acquire a plurality of sound data, each corresponding to a sound from the voiced sound start point to the voiced sound end point, regarding a plurality of pieces of the voiced sound section, respectively, in the play-section of the moving image,
wherein the plurality of voiced sound sections include a first voiced sound section and a second voiced sound section;
wherein the first voiced sound section is determined by the moving image editing point determination unit as the moving image editing point is within the first voiced sound section;
wherein the second voiced sound section is different from the first voiced sound section, the second voiced sound section is a voiced sound section of which a voiced sound start point is within a period from a voiced sound editing point that is a voiced sound start point of the first voiced sound section until a predetermined elapsed period of time after the voiced sound editing point; and
wherein the sound acquire unit is configured to acquire the plurality of sound data, even when the voiced sound end point of each of the voiced sound sections is not within a period from the voiced sound editing point until the predetermined elapsed period of time after the voiced sound editing point;
a text extraction unit which is configured to extract a plurality of texts converted from the plurality of sound data, respectively, acquired by the sound acquire unit; and
a combined data preparation unit which is configured to prepare a data for generating a text-combined still image in which the plurality of texts extracted by the text extraction unit are combined into a still image based on the still image data extracted by the still image data extraction unit.

2. The computer readable medium according to claim 1, wherein the information processing program causes the computer to execute as a speaker identification unit which identifies a speaker of the voice sound to be played in each of the voiced sound sections, in the play-section of the moving image, in which a voiced sound start point thereof is within the period from the voiced sound editing point until the predetermined elapsed period of time after the voiced sound editing point; and
the combined data preparation unit combines the plurality of texts extracted by the text extraction unit into the still image while associating each of the plurality of texts with the speaker of the voice sound of one of the plurality of sound data in the voiced sound sections based on which the plurality of texts are extracted respectively.

3. The computer readable medium according to claim 2, wherein the information processing program causes the computer to execute as a person-in-the image recognition unit which recognizes a plurality of persons appearing in the image outputted at the moving image editing point set by the moving image editing point setting unit, and a collation unit which collates each of the plurality of persons in the image recognized by the person-in-the-image recognition unit with a plurality of pieces of the speaker identified by the speaker identification unit; and
the combined data preparation unit associates each of the plurality of texts extracted by the text extraction unit with each person, among the plurality of persons, who is identified by the person-in-the-image recognition unit as a same person as the speaker of the voice sound of one of the plurality of sound data in the voiced sound sections based on which the plurality of texts are extracted, respectively, and combines the plurality of texts into the still image.

4. The computer readable medium according to claim 3, wherein the information processing program causes the computer to execute as a text area setting unit which sets, in the still image, a plurality of text areas associated with the plurality of persons, respectively, in the image, and
the combined data preparation unit combines the plurality of texts into the still image so that the plurality of texts are combined in the plurality of text areas, respectively, each of which is set by the text area setting unit with respect to one of the plurality of persons who is identified by the person-in-the-image recognition unit as the same person as the speaker of the voice sound of each of the plurality of sound data in the voiced sound sections based on which the plurality of texts are extracted respective.

5. The computer readable medium according to claim 4, wherein the text area setting unit sets a speech balloon having a shape in which the speech balloon is blown out from each of the plurality of persons in the image as one of the plurality of text areas associated with the plurality of persons in the image, respectively.

6. The computer readable medium according to claim 5, wherein under a condition that the collation unit determines that a certain person, among the plurality of persons, identified as the same person as the speaker of the voice sound, of each of the plurality of sound data in the voiced sound sections based on which the plurality of texts are extracted respectively, is not included in the plurality of persons in the image, the text area setting unit sets a speech balloon having another shape in which the speech balloon is blown out from a frame of the still image to inside of the frame as a text area, among the plurality of text areas, associated with the certain person; and
the combined data preparation unit combines the plurality of texts into the still image so that a text, among the plurality of texts, which is determined as being associated with the certain person not included in the plurality of persons in the image is combined into the speech balloon having the another shape in which the speech balloon is blown out from the frame of the still image to the inside of the frame.

7. The computer readable medium according to claim 4, wherein the information processing program causes the computer to execute as a voice sound classification unit which analyzes a plurality of pieces of the voice sound played in the plurality of voiced sound sections, respectively, a voiced sound starting point of each of the voiced sound sections being within a period from the voiced sound editing point until the predetermined elapsed period of time after the voiced sound start point and classifies each of the voice sounds based on the analysis; and
the text area setting unit changes a text-area aspect of each of the text areas according to the classification made by the voice sound classification unit.

8. The computer readable medium according to claim 7, wherein the voice sound classification unit classifies the plurality of voice sounds by a loudness thereof; and
the text area setting unit sets a first text-area aspect as the text-area aspect regarding a voice sound, among the voice sounds, which is analyzed by the voice sound classification unit as having a first loudness, and sets a second text-area aspect different from the first text-area aspect as the text-area aspect regarding another voice sound, among the voice sounds, which is analyzed by the voice sound classification unit as having a second loudness different from the first loudness.

9. The computer readable medium according to claim 7, wherein the voice sound classification unit classifies the plurality of voice sounds by emotion presumed as emotion of the speaker thereof; and
the text area setting unit sets a first text-area aspect as the text-area aspect regarding a voice sound, among the voice sounds, which is analyzed by the voice sound classification unit as having a first emotion, and sets a second text-area aspect different from the first text-area aspect as the text-area aspect regarding another voice sound, among the voice sounds, which is analyzed by the voice sound classification unit as having a second emotion different from the first emotion.

10. The computer readable medium according to claim 4, wherein
the combined data preparation unit combines the plurality of texts extracted by the text extraction unit into the still image so that each of the plurality of texts has characters of which number is less than a predetermined character number.

11. The computer readable medium according to claim 4, wherein the information processing program causes the computer to execute as a person-in-the-image classification unit which analyzes the plurality of persons in the image recognized by the person-in-the-image recognition unit, and which classifies each of the persons based on the analysis; and
the text area setting unit changes a text-area aspect of each of the text areas according to the classification made by the person-in-the-image classification unit.

12. The computer readable medium according to claim 11, wherein the person-in-the-image classification unit classifies the plurality of persons in the image by emotion presumed as emotion of each of the persons; and
the text area setting unit sets a first text-area aspect as the text-area aspect regarding a person in the image, among the persons in the image, who is analyzed by the person-in-the-image unit as having a first emotion, and sets a second text-area aspect different from the first text-area aspect as the text-area aspect regarding another person in the image, among the persons in the image, who is analyzed by the person-in-the-image unit as having a second emotion different from the first emotion.

13. An information processing apparatus which is configured to process a stored moving image and a stored sound to be synchronously played with the moving image, the information processing apparatus comprising:
a moving image editing point setting unit which is configured to set, as a moving image editing point for a moving image, a point of time included in a play-section of the moving image,
wherein the point of time set as the moving image editing point by the moving image editing point setting unit is at a time subsequent to storage of the moving image;
a still image data extraction unit which is configured to extract a still image data corresponding to an image outputted at the moving image editing point set by the moving image editing point setting unit;
a moving image editing point determination unit which is configured to determine whether or not the moving image editing point set by the moving image editing point setting unit is within a voiced sound section,
wherein the voiced sound section is a section in which a voice sound is within the sound to be synchronously played with the moving image and which includes a voiced sound start point as a start point of the voiced sound section and a voiced sound end point as an end point of the voiced sound section;
a sound acquire unit which is configured to acquire a plurality of sound data, each corresponding to a sound from the voiced sound start point to the voiced sound end point, regarding a plurality of pieces of the voiced sound section, respectively, in the play-section of the moving image,
wherein the plurality of voiced sound sections include a first voiced sound section and a second voiced sound section;
wherein the first voiced sound section is determined by the moving image editing point determination unit as the moving image editing point is within the first voiced sound section;

wherein the second voiced sound section is different from the first voiced sound section, the second voiced sound section is a voiced sound section of which a voiced sound start point is within a period from a voiced sound editing point that is a voiced sound start point of the first voiced sound section until a predetermined elapsed period of time after the voiced sound editing point; and wherein the sound acquire unit is configured to acquire the plurality of sound data, even when the voiced sound end point of each of the voiced sound sections is not within a period from the voiced sound editing point until the predetermined elapsed period of time after the voiced sound editing point, a text extraction unit which is configured to extract a plurality of texts converted from the plurality of sound data, respectively, acquired by the sound acquire unit; and a combined data preparation unit which is configured to prepare a data for generating a text-combined still image in which the plurality of texts extracted by the text extraction unit are combined into a still image based on the still image data extracted by the still image data extraction unit.

14. A method for processing a stored moving image and a stored sound to be synchronously played with the moving image, the method comprising:

a step of setting a moving image editing point in which, as a moving image editing point for a moving image, a point of time within a play-section of the moving image is set,
wherein the point of time set as the moving image editing point is at a time subsequent storage of the moving image:

a step of extracting a still image data, in which a still image data corresponding to an image outputted at the moving image editing point set by the step of setting the moving image editing point is extracted;

a step of determining a moving image editing point in which whether or not the moving image editing point set by the step of setting the moving image editing point is within a voiced sound section is determined, wherein the voiced sound section is a section in which a voice sound is within the sound to be synchronously played with the moving image and which includes a voiced sound start point as a start point of the voiced sound section and a voiced sound end point as an end point of the voiced sound section;

a step of acquiring a plurality of sound data, each corresponding to a sound from the voiced sound start point to the voiced sound end point, regarding a plurality of pieces of the voiced sound section, respectively, in the play-section of the moving image,
wherein the plurality of voiced sound sections include a first voiced sound section and a second voiced sound section;
wherein the first voiced sound section is determined by the moving image editing point determining step as the moving image editing point is within the first voiced sound section;
wherein the second voiced sound section is different from the first voiced sound section, the second voiced sound section is a voiced sound section of which a voiced sound start point is within a period from a voiced sound editing point that is a voiced sound start point of the first voiced sound section until a predetermined elapsed period of time after the voiced sound editing point; and
wherein the step of acquiring the plurality of sound data acquires the plurality of sound data, even when the voiced sound end point of each of the voiced sound sections is not within a period from the voiced sound editing point until the predetermined elapsed period of time after the voiced sound editing point;

a step of exacting a plurality of texts converted from the plurality of sound data, respectively, acquired by the step of acquiring the plurality of sound data; and a step of preparing a data for generating a text-combined still image is prepared in which the plurality of texts extracted by the step of extracting the plurality of texts are combined into a still image based on the still image data extracted by the step of extracting the still image data.

* * * * *